United States Patent [19]

Flam

[11] Patent Number: 4,503,323

[45] Date of Patent: Mar. 5, 1985

[54] MACHINE READABLE PUNCH CARD

[76] Inventor: Frederick H. Flam, 2160 Century Park East -#1802N, Los Angeles, Calif. 90067

[21] Appl. No.: 478,662

[22] Filed: Mar. 25, 1983

[51] Int. Cl.³ .............................................. G06K 21/00
[52] U.S. Cl. .................................. 235/489; 273/148 R
[58] Field of Search ..................... 235/489; 273/148 R

[56] References Cited

U.S. PATENT DOCUMENTS 4,353,555  10/1982  Flam ................................. 273/148 R

*Primary Examiner*—Harold I. Pitts
*Attorney, Agent, or Firm*—Flam & Flam

[57] ABSTRACT

The punch card is designed to provide a readable hole that is offset from, but intersects the window area of the reader. The punch hole plug is preformed by a pair of arcuate cuts held together by tabs at opposite sides. A small pilot hole at the center of the plug receives the narrow shank of a stylus. A shoulder above the stylus shank engages about the pilot hole and pushes the plug into a recess, tearing the two tabs away. The pilot hole is offset from the read window.

2 Claims, 7 Drawing Figures

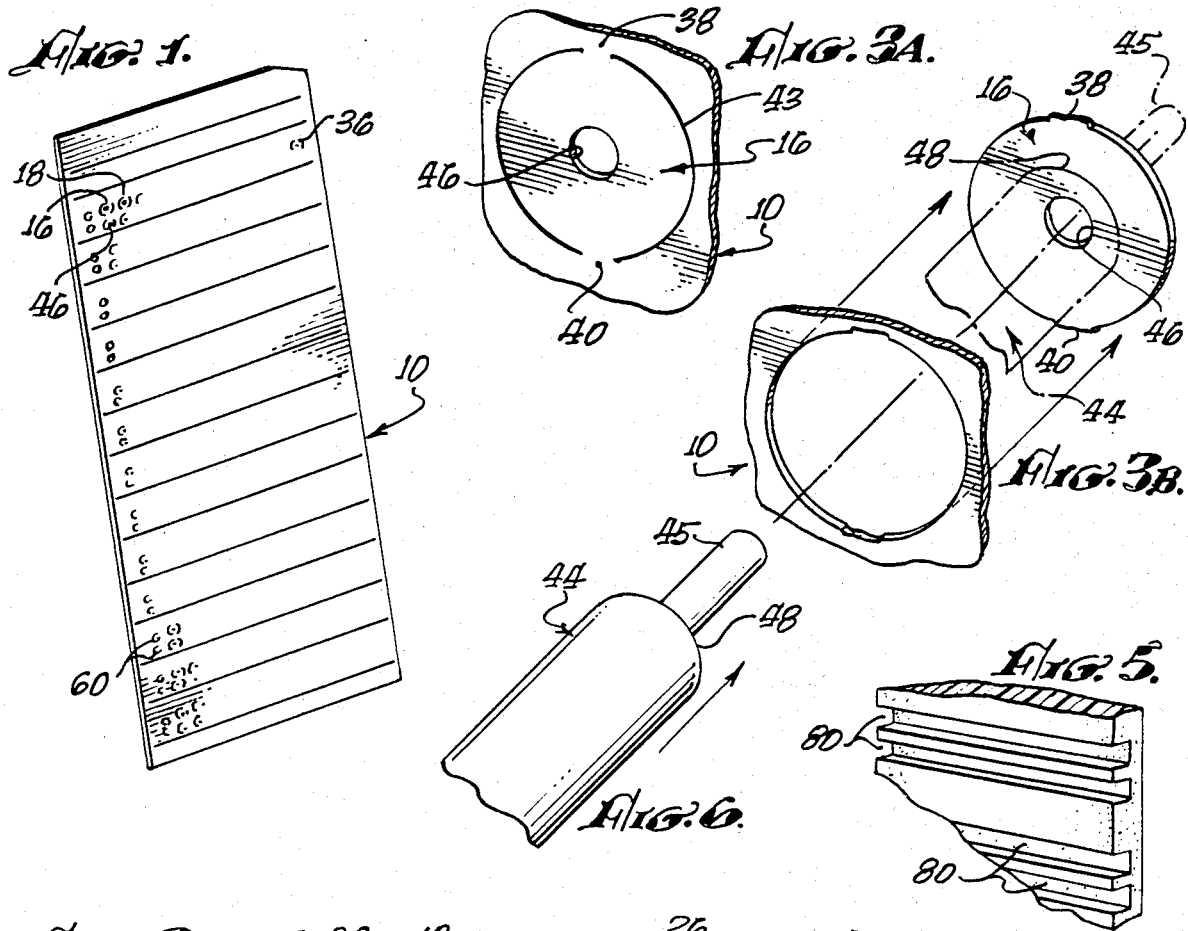
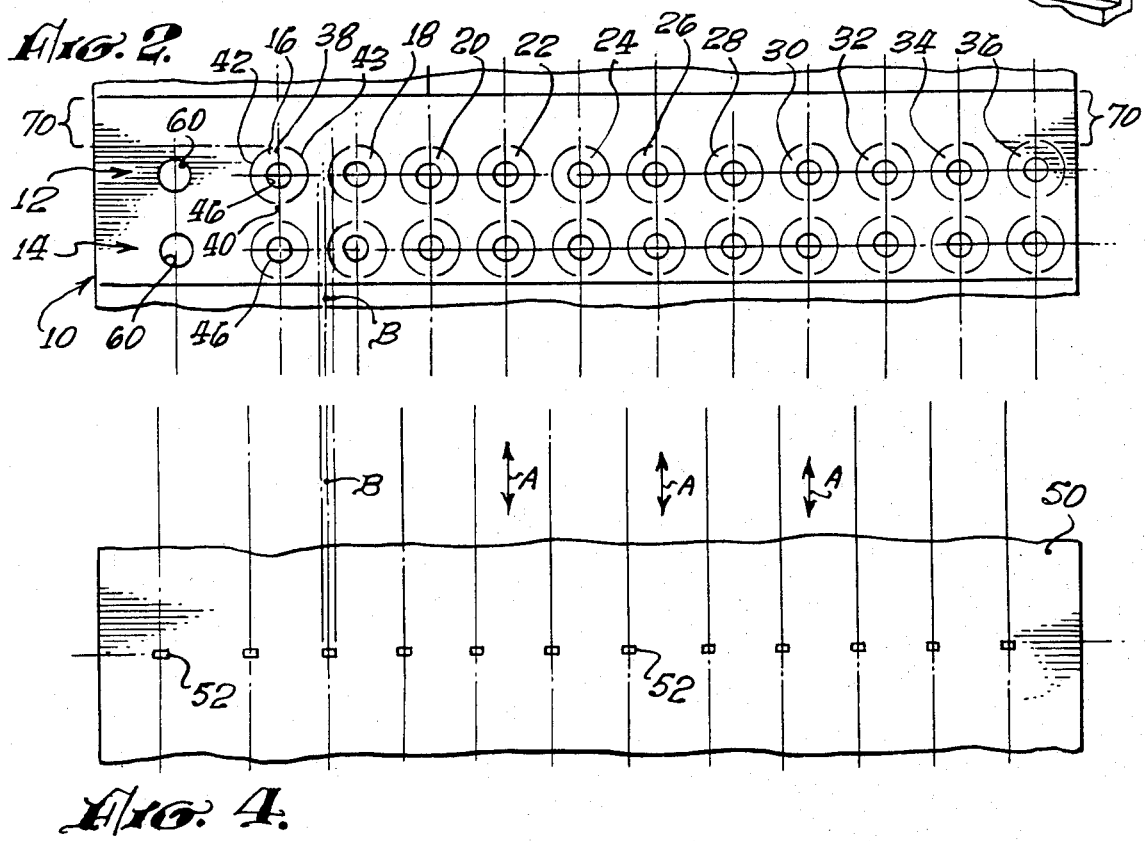

MACHINE READABLE PUNCH CARD

FIELD OF INVENTION

This invention relates to machine readable punch cards.

BACKGROUND OF THE INVENTION

The standard punch card utilizes rectangular plugs. The card cooperates with a guide sheet above and a gripper below. The guide may have a series of holes centered on the rectangular plugs. A holder is required to maintain registry between the card, the guide and the gripper. The plugs, when engaged by a stylus, tend to yield at only two of the four corners, leaving a partially removed plug hinged at two of the corners. In order to complete the removal of the plug, the card holder has a rubber plate with a series of parallel cuts aligned with the plugs. The stylus from above pushes the tab into the slots, which grip the plug. Ultimately, when the card is removed from the holder, the plugs are torn from the corners and, hopefully, a neat hole is formed. This arrangement requires a special guide and a relatively complicated holder.

OBJECT OF THE INVENTION

The primary object of this invention is to provide a machine readable punch card that requires no separate guide and that requires no holder at all.

SUMMARY OF INVENTION

In order to accomplish the foregoing objective, I utilize a narrow window reader and a punch card that has holes arrayed in offset relationship to the read windows. Each hole is formed by a plug having a pilot hole at or near the center. The pilot hole is entirely offset from the read window so that it is not perceived by the reader. A shouldered stylus, pushed through the hole, tears the plug away. The remaining hole at least partially intersects the read window to provide machine perception.

BRIEF DESCRIPTION OF THE DRAWINGS

A detailed description of the invention will be made with reference to the accompanying drawings wherein like numerals designate corresponding parts in the several figures. These drawings are to scale.

FIG. 1 is a pictorial view of a punch card incorporating the present invention.

FIG. 2 is an enlarged view showing part of the punch card.

FIG. 3A is an enlarged view of one of the plugs attached.

FIG. 3B is a view similar to FIG. 3A, but showing the plug detached.

FIG. 4 is a plan view of a read head cooperable with the punch card.

FIG. 5 is a pictorial view of a fragment of the platen part of a holder cooperable with the punch card.

FIG. 6 illustrates a stylus for use with the punch card.

DETAILED DESCRIPTION OF THE PREFERRED EMBODIMENT

The following detailed description is of the best presently contemplated mode of carrying out the invention. This description is not to be taken in a limiting sense, but is made merely for purposes of illustrating the general principles of the invention, since the scope of the invention is best defined by the appended claims.

A punch card 10 shown in FIG. 1, in this instance, has fourteen lines for encoding information usable, for example, in a scoring system shown and described in U.S. Pat. No. 4,353,555, issued Oct. 12, 1982, and entitled DUPLICATE BRIDGE SCORING SYSTEM. One of the lines is illustrated in FIG. 2. It contains two rows 12 and 14 for encoding information. Each row includes, in this instance, eleven plugs 16, 18, 20, 22, 24, 26, 28, 30, 32, 34, 36 designed to form readable holes. Each plug is made in any desired manner to provide residual attachment tabs, as at 38 and 40 (FIG. 3A) that, when broken away (FIG. 3A), release the plug 16. In the present instance, the plug is formed by two companion arcuate cuts 42 and 43.

In order to break the tabs 38 and 40, a stylus 44 (FIG. 6) is provided. The stylus 44, which is conveniently a ball point pen, has a shank 45 that enters a pilot hole as at 46 located at the center of each plug. A shoulder 48 at the base of the shank 45 engages about the edges of the pilot hole 46 to push the plug sufficiently to tear the tabs 38 and 40.

The punch card 10 cooperates with a read head 50 shown in FIG. 4. A suitable transport mechanism (not shown) moves the card longitudinally past the read head 50 in the direction of arrows A.

A standard read head has twelve read apertures located on one quarter inch centers for a standard card width off three and a quarter inches. Conforming to this standard, the read head apertures 52 are so located. The apertures or windows 52 are fairly narrow. Sensor Technology, Inc. of Chatsworth, Calif. manufactures and sells a read head in which the windows have a width of 0.045 inches, leaving about 0.205 inches between windows.

The plugs 16, 18, etc. are laterally offset from the quarter inch spaced center lines B on the card so that the pilot holes 46 miss the read windows 52, and so that the plug, when removed, intersects one read window and not the adjacent read window. A 3/16" plug with a 1/16" pilot hole works quite well. This is compatible with the read window dimension and the 1/16" pilot hole fits a standard shank 45 of many ball point pens.

The punch card can be clocked in any way compatible with the reader. In the present instance, holes 60 perform a clock function, the holes 60 being centered on the first read window. Edge clock bars can be provided instead, according to reader design.

If the reader is insensitive to the red end of the spectrum, a red ball point pen can be used to write on the card as well as to punch out the required punch hole plugs. For example, the space 70 may be used to write scores for anomaly check with the machine markings. The card can be hand held while the stylus is used to punch out plugs. If a holder is required or desired, it can simply provide open ended channels 80 to receive the punched out plugs. No complicated grippers are required, since all of the tabs break away as the stylus pushes through the plug.

Legends (not shown) are suitably printed on the card to identify the meaning of various holes. The legends may be printed in machine invisible ink.

Intending to claim all novel, useful and unobvious features shown or described, I make the following:

1. A punch card cooperable with a reader, said card having an array of plugs on the card, each of the plugs being joined to the main body of the card by a plurality of breakaway tabs, there being a pilot hole at or near the center of each of the plugs, the pilot holes being laterally offset to miss read windows of the companion reader, the hole made by each of the plugs at least partially intersecting one of the read windows of the companion reader.

2. A punch card cooperable with a reader having narrow read windows located on standard centers, said punch card having an array of circular plugs on the card, each of the plugs being joined to the main body of the card by two breakaway tabs on opposite sides, each of the plugs having a pilot hole at the center of the plug and laterally offset from the said centers to miss the read windows, the hole made by each of the plugs at least partially intersecting one of the read windows but yet being offset from the adjacent windows.

* * * * *